(12) United States Patent  (10) Patent No.: US 8,716,883 B2
Kim  (45) Date of Patent: May 6, 2014

(54) MOBILE TERMINAL AND CONTROL METHOD THEREOF

(75) Inventor: Sooyun Kim, Gyeonggi-Do (KR)

(73) Assignee: LG Electronics, Inc., Seoul (KR)

( * ) Notice: Subject to any disclaimer, the term of this patent is extended or adjusted under 35 U.S.C. 154(b) by 815 days.

(21) Appl. No.: 12/862,810

(22) Filed: Aug. 25, 2010

(65) Prior Publication Data

US 2011/0181106 A1    Jul. 28, 2011

(30) Foreign Application Priority Data

Jan. 27, 2010    (KR) .................. 10-2010-0007583

(51) Int. Cl.
  *B60L 1/00*  (2006.01)
  *B60L 3/00*  (2006.01)
  *H02G 3/00*  (2006.01)

(52) U.S. Cl.
  USPC .......... 307/9.1; 307/10.1; 307/10.6; 307/10.8

(58) Field of Classification Search
  USPC .......................................... 307/9.1; 455/574
  See application file for complete search history.

(56) References Cited

U.S. PATENT DOCUMENTS

2005/0136991 A1*  6/2005  Oesterling et al. ............ 455/574
2006/0111156 A1    5/2006  Choi et al.
2008/0200220 A1    8/2008  Jackson
2010/0159897 A1    6/2010  Choi et al.

FOREIGN PATENT DOCUMENTS

KR    10-0669609 B1    1/2007
KR    10-0830832 B1    5/2008
KR    10-2009032186 A    4/2009

OTHER PUBLICATIONS

PCT International Search and written Opinion Report dated May 31, 2011 for Application No. PCT/KR2010/005472, 10 pages.
European Search Report dated Aug. 12, 2013 for Application No. 10844789.7, 7 pages.

* cited by examiner

*Primary Examiner* — Stephen W Jackson
*Assistant Examiner* — Toan Vu
(74) *Attorney, Agent, or Firm* — Fish & Richardson P.C.

(57) ABSTRACT

Disclosed is a mobile terminal capable of converting an operational state of a controller thereof upon generation of a preset event and controlling an operational state of a particular terminal having a communication connection under control of the controller, and a control method thereof, the control method for controlling power functions within a vehicle telematics control unit comprising: accessing stored voltage information for a battery included in a vehicle; determining a present voltage characteristic of the battery based on measurements of voltage; determining whether a difference exists between the stored voltage information and the present voltage characteristic; converting an operational state of a vehicle telematics control unit responsive to determining that a difference exists; accessing threshold information associated with the battery; comparing the present voltage characteristic of the battery to the threshold information; determining whether the present voltage characteristic of the battery satisfies a threshold requirement indicated by the threshold information; and generating a first control signal responsive to determining that the present voltage characteristic of the battery satisfies the threshold requirement indicated by the threshold information.

14 Claims, 10 Drawing Sheets

MOBILE TERMINAL AND CONTROL METHOD THEREOF

CROSS-REFERENCE TO RELATED APPLICATION

Pursuant to 35 U.S.C. §119(a), this application claims the benefit of an earlier filing date and right of priority to Korean Application No. 10-2010-0007583, filed on Jan. 27, 2010, the contents of which is incorporated by reference herein in its entirety.

BACKGROUND

Mobile devices can be used to provide wireless communication between users. As mobile device capability has advanced in recent years, mobile devices have increasingly become able to provide functionality in addition to wireless communication. For example, some mobile devices provide global positioning system (GPS) functionality. Other mobile devices provide a display and touch screen functionality.

SUMMARY

In general, an object of the present invention is to provide a mobile terminal capable of converting operational states of a plurality of devices included in a controller thereof upon detection of a voltage variation of a battery equipped in a battery management system, and a control method thereof.

Another object of the present invention is to provide a mobile terminal capable of controlling an operational state of an external terminal having a mutual communication connection upon generation of a preset event, and a control method thereof.

Another object of the present invention is to provide a mobile terminal capable of determining a power-on/off state of a vehicle by detecting a voltage variation of a battery equipped in a battery management system, and a control method thereof.

According to an aspect of the present invention, there is provided a control method for controlling power functions within a vehicle telematics control unit, including: accessing stored voltage information for a battery included in a vehicle; determining a present voltage characteristic of the battery based on measurements of voltage; determining whether a difference exists between the to stored voltage information and the present voltage characteristic; converting an operational state of a vehicle telematics control unit responsive to determining that a difference exists; accessing threshold information associated with the battery; comparing the present voltage characteristic of the battery to the threshold information; determining whether the present voltage characteristic of the battery satisfies a threshold requirement indicated by the threshold information; and generating a first control signal responsive to determining that the present voltage characteristic of the battery satisfies the threshold requirement indicated by the threshold information.

According to another aspect of the present invention, there is provided a battery management system for controlling power functions within a vehicle telematics control unit, including: a first memory configured to store voltage information for a battery included in a vehicle; a voltage characteristic identification unit configured to determine a present voltage characteristic of the battery based on measurements of voltage; a voltage variation identification unit configure to determine whether a difference exists between the stored voltage information and the present voltage characteristic; a state converter configured to convert an operational state of a vehicle telematics control unit responsive to determining that a difference exists; a second memory configured to store threshold information associated with the battery; a comparator configured to compare the present voltage characteristic of the battery to the threshold information; a battery state identifier configure to determine whether the present voltage characteristic of the battery satisfies a threshold requirement indicated by the threshold information; and a control signal generator configured to generate a first control signal responsive to determining that the present voltage characteristic of the battery satisfies the threshold requirement indicated by the threshold information.

According to another aspect of the present invention, there is provided a control method for controlling power functions within a vehicle, including: establishing a communication session between a communications unit and a remote computing device; performing a communication function in accordance with the established communication session; determining that the communication function has completed; converting a state of the communications unit from an active state to an inactive state responsive to the determination that the communication function has completed; determining that the communications unit has transitioned from the active state to the inactive state; converting a state of a telematics control unit from an active state to an inactive state responsive to the determination that the communications unit has transitioned from an active state to an inactive state; determining that the telematics control unit has transitioned from the active state to the inactive state; and converting a state of a micro computer from a first mode to a second mode responsive to the determination that the control unit has transitioned from the active state to the inactive state.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION

Figure 1:
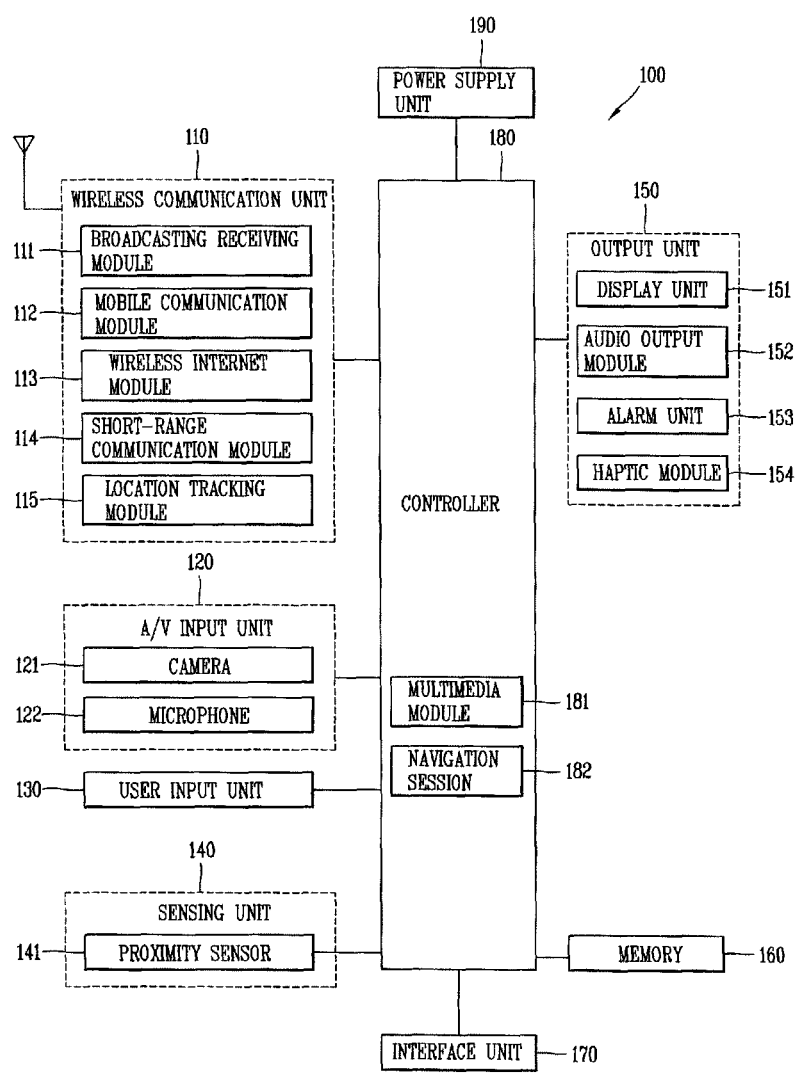
FIG. 1 is a block diagram showing an example configuration of a mobile terminal in accordance with one embodiment of the present invention.

FIG. 1 is a block diagram showing a configuration of a mobile terminal (or mobile communication terminal) 100 in accordance with one embodiment of the present invention.

The mobile terminal 100 may be implemented in various forms, such as mobile phones, smart phones, notebook computers, digital broadcast terminals, PDAs (Personal Digital Assistants), PMPs (Portable Multimedia Player), or other devices.

As shown in FIG. 1, the mobile communication terminal 100 includes a wireless communication unit 110, an A/V (AudioNideo) input unit 120, a user input unit 130, a sensing unit 140, an output unit 150, a memory 160, an interface unit 170, a controller 180, and a power supply unit 190. The configuration of FIG. 1 is exemplary, as the mobile communication terminal 100 may be include greater or fewer components.

The wireless communication unit 110 can include one or more components providing functionality for radio communication between the mobile communication terminal 100 and a wireless communication system or a network in which the mobile communication terminal is located. For example, the wireless communication unit may include at least one of a broadcast receiving module 111, a mobile communication module 112, a wireless Internet module 113, a short-range communication module 114, and a location information module 115.

The broadcast receiving module 111 receives broadcast signals and/or broadcast associated information from an external broadcast management server (or other network entity) via a broadcast channel. The broadcast channel may include a satellite channel and/or a terrestrial channel. The broadcast management server may be a server that generates and transmits a broadcast signal and/or broadcast associated information or a server that receives a previously generated broadcast signal and/or broadcast associated information and transmits the same to a terminal. The broadcast associated information may refer to information associated with a broadcast channel, a broadcast program or a broadcast service provider. The broadcast signal may include a TV broadcast signal, a radio broadcast signal, a data broadcast signal, or another signal. Also, the broadcast signal may further include a broadcast signal combined with a TV or radio broadcast signal.

The broadcast associated information also may be provided via a mobile communication network and, in this case, the broadcast associated information may be received by the mobile communication module 112. The broadcast signal may exist in various forms. For example, broadcast associated information may be implemented according to various formats, such as an electronic program guide (EPG) of a digital multimedia broadcasting (DMB) broadcast or an electronic service guide (ESG) of a digital video broadcast-handheld (DVB-H) broadcast.

The broadcast receiving module 111 may be configured to receive signals broadcast using various types of broadcast systems. In particular, the broadcast receiving module 111 may receive a digital broadcast using a digital broadcast system such as a multimedia broadcasting-terrestrial (DMB-T) system, a digital multimedia broadcasting-satellite (DMB-S) system, a digital video broadcast-handheld (DVB-H) system, a data broadcasting system such as media forward link only (MediaFLO®), an integrated services digital broadcast-terrestrial (ISDB-T) system, or other broadcast system. The broadcast receiving module 111 may be configured to be suitable for broadcast systems that provide a broadcast signal as well as the above-mentioned digital broadcast systems. Broadcast signals and/or broadcast-associated information received via the broadcast receiving module 111 may be stored in the memory 160.

The mobile communication module 112 may transmit and receive radio signals to and from at least one of a base station (e.g., access point, Node B, etc.), an external terminal (e.g., other user devices) and a server (or other network entities). Such radio signals may include a voice call signal, a video call signal or various types of data associated with text and/or multimedia message transmission and/or reception. The wireless Internet module 113 supports wireless Internet access for the mobile communication terminal. This module may be internally or externally coupled to the terminal. The wireless Internet protocol used can include, for example, a wireless local area network (WLAN), Wi-Fi, wireless broadband (WiBro), world interoperability for microwave access (WiMAX), high speed downlink packet access (HSDPA), and the like.

The short-range communication module 114 is a module for supporting short range communications. Some examples of short-range communication technology include Bluetooth™, Radio Frequency Identification (RFID), Infrared Data Association (IrDA), Ultra-WideBand (UWB), and ZigBee™.

The location information module 115 is a module for identifying or acquiring a location (or position) of the mobile communication terminal or vehicle in which the mobile communication terminal is located. For example, the location information module 115 may be embodied using a GPS module that receives location information from a plurality of satellites. Here, the location information may include coordinate information represented by latitude and longitude values. For example, the GPS module may measure time and distance with respect to three or more satellites so as to accurately calculate a current location of the mobile communication terminal 100 according to trigonometry based on the measured time and distances. A method of acquiring distance and time information from three satellites and performing error correction with a single satellite may be used. In particular, the GPS module may acquire time and three-dimensional speed information as well as a latitude, longitude, and altitude from the location information received from the satellites. In some implementations, a Wi-Fi position system and/or hybrid positioning system may be used as the location information module 115.

The A/V input unit 120 is configured to receive an audio or video signal. The A/V input unit 120 may include a camera 121 and a microphone 122. The camera 121 processes image data of still pictures or video obtained by an image capture device in a video capturing mode or an image capturing mode.

The processed image frames may be displayed on a display unit 151 (or other visual output device). The image frames processed by the camera 121 may be stored in the memory 160 (or other storage medium) or transmitted via the wireless communication unit 110. Two or more cameras 121 may be provided according to the configuration of the mobile communication terminal.

The microphone 122 may receive sounds (audible data) via a microphone (or the like) in a phone call mode, a recording mode, a voice recognition mode, or other modes and can process the received sounds into audio data. In implementations using mobile telephone systems, the processed audio data may be converted for output into a format transmittable to a mobile communication base station (or other network entity) via the mobile communication module 112. The microphone 122 may implement various types of noise canceling (or suppression) algorithms to cancel (or suppress) noise or interference generated in the course of receiving and transmitting audio signals.

The user input unit 130 may generate key input data from commands entered by a user to control various operations of the mobile communication terminal 100. The user input unit 130 allows the user to enter various types of information, and may include a keypad, a dome switch, a touch pad (e.g., a touch sensitive member that detects changes in resistance, pressure, capacitance, etc. due to being contacted) a jog wheel, a jog switch, or other input mechanisms. In particular, when the touch pad is overlaid on the display unit 151 in a layered manner, it may form a touch screen.

The sensing unit 140 detects a current status (or state) of the mobile communication terminal 100, such as an opened or closed state of the mobile communication terminal 100, a location of the mobile communication terminal 100, the presence or absence of user contact with the mobile communication terminal 100 (i.e., touch inputs), the orientation of the mobile communication terminal 100, or an acceleration or deceleration movement and direction of the mobile communication terminal 100 so as to generate commands or signals for controlling the operation of the mobile communication terminal 100. For example, when the mobile communication terminal 100 is implemented as a slide type mobile phone, the sensing unit 140 may sense whether the slide phone is opened or closed. In addition, the sensing unit 140 can detect whether or not the power supply unit 190 supplies power or whether or not the interface unit 170 is coupled with an external device. The sensing unit 140 may include a proximity sensor 141.

The output unit 150 is configured to provide outputs in a visual, audible, and/or tactile manner (e.g., audio signal, video signal, alarm signal, or vibration signal). The output unit 150 may include the display unit 151, an audio output module 152, an alarm unit 153, a haptic module 154, or other components.

The display unit 151 may output information processed in the mobile communication terminal 100. For example, when the mobile communication terminal 100 is in a phone call mode, the display unit 151 may display a User Interface (UI) or a Graphic User Interface (GUI) associated with a call or other communication (such as text messaging or multimedia file downloading). When the mobile communication terminal 100 is in a video call mode or image capturing mode, the display unit 151 may display a captured image and/or a received image, a UI or GUI that shows videos or images and functions related thereto. The display unit 151 may include at least one of a Liquid Crystal Display (LCD), a Thin Film Transistor-LCD (TFT-LCD), an Organic Light Emitting Diode (OLED) display, a flexible display, or a three-dimensional (3D) display. In some implementations, a display of the display unit 151 is configured to be transparent or light-transmissive to allow viewing of the exterior. A transparent display may be, for example, a TOLED (Transparent Organic Light Emitting Diode) display. Through such configuration, the user can view an object positioned at the rear side of the terminal body through the region occupied by the display unit 151 of the terminal body.

The mobile communication terminal 100 may include two or more display units (or other display means) according to its particular desired functionality. For example, a plurality of display units may be separately or integrally disposed on one surface of the mobile terminal, or may be separately disposed on mutually different surfaces. When the display unit 151 and a sensor (referred to as a 'touch sensor' or 'touch screen,' hereinafter) for detecting a touch operation are overlaid in a layered manner to form a touch screen, the display unit 151 may function as both an input device and an output device. The touch sensor may, for example, have a form of a touch film, a touch sheet, a touch pad, or a touch panel. In some cases, touch sensors (or touch screens) can operate without an actual physical contact. For example, touch screens operating on changed capacitance or other electrical characteristics may operate by the nearby presence of a finger or object with or without physical contact with the screen. As such, a "touch screen" may not actually require a touch for operation.

The touch sensor may be configured to convert pressure applied to a particular portion of the display unit 151 or a change in the capacitance or other electrical characteristic at a particular portion of the display unit 151 into an electrical input signal. The touch sensor may be configured to detect the pressure when a touch is applied, as well as the touched position and area. When there is a touch input with respect to the touch sensor, a corresponding signal is transmitted to a touch controller (not shown). The touch controller processes the signals and transmits corresponding data to the controller 180. Accordingly, the controller 180 may recognize which portion of the display unit 151 has been touched.

The proximity sensor 141 may be disposed within or near the touch screen. The proximity sensor 141 is a sensor for detecting the presence or absence of an object relative to a certain detection surface or an object that exists nearby using the force of electromagnetism or infrared rays without a physical contact. Thus, the proximity sensor 141 can have a considerably longer life span than a contact type sensor and can be utilized for various purposes. Examples of the proximity sensor 141 may include a transmission type photoelectric sensor, a direct reflection type photoelectric sensor, a mirror-reflection type photo sensor, an RF oscillation type proximity sensor, a capacitance type proximity sensor, a magnetic proximity sensor, and an infrared proximity sensor. If the touch screen is a capacitance type touch screen, proximity of the pointer can be detected by a change in electric field according to the proximity of the pointer. In this case, the touch screen may be classified as a proximity sensor.

In the following description, for the sake of brevity, recognition of the pointer positioned to be close to the touch screen will be called a 'proximity touch', while recognition of actual contacting of the pointer on the touch screen will be called a 'contact touch'. In this case, when the pointer is in the state of the proximity touch, it means that the pointer is positioned to correspond vertically to the touch screen. By employing the proximity sensor 141, a proximity touch and a proximity touch pattern (e.g., a proximity touch distance, a proximity touch speed, a proximity touch time, a proximity touch position, or a proximity touch movement state) can be detected, and information corresponding to the detected proximity touch operation and the proximity touch pattern can be outputted to the touch screen.

The audio output module 152 may convert and output sound from audio data received from the wireless communication unit 110 or stored in the memory 160 in various modes. The modes may include a call signal reception mode, a call mode, a record mode, a voice recognition mode, a broadcast reception mode, or other modes. Also, the audio output module 152 may provide audible outputs related to a particular function executed by the mobile communication terminal 100 (e.g., a call signal reception sound or a message reception sound). The audio output module 152 may include a speaker, a buzzer, or other sound generating device.

The alarm unit 153 may provide outputs to inform a user about the occurrence of an event of the mobile communication terminal 100. Typical events may include receipt of a call, receipt of a message, or received key or touch input. In addition to audio or video outputs, the alarm unit 153 may provide outputs in a different manner to inform the user about the occurrence of an event. For example, the alarm unit 153 may provide an output in the form of vibration (or other tactile or sensible output). In particular, when a call, a message, or some other incoming communication is received, the alarm unit 153 may provide tactile output (i.e., vibration) to inform the user thereof. By providing such tactile output, the user can recognize the occurrence of various events even if his mobile phone is in the user's pocket. Output informing about the occurrence of an event can also be provided via the display unit 151 or the audio output module 152. The display unit 151 and the audio output module 152 may be classified as a part of the alarm unit 153.

A haptic module 154 generates various tactile effects the user may feel. A typical example of the tactile effects generated by the haptic module 154 is vibration. The strength and pattern of the haptic module 154 can be controlled. For example, different vibrations may be combined to be outputted or sequentially outputted. Besides vibration, the haptic module 154 may generate various other tactile effects. The generated effects can include stimulation with a pin arrangement moving vertically with respect to a contact skin, a spray force or suction force of air through a jet orifice or a suction opening, a contact on the skin, a contact of an electrode, electrostatic force, and the sense of cold or warmth using an element that can absorb or generate heat. In addition, the haptic module 154 may be implemented to allow the user to feel a tactile effect through a muscle sensation such as fingers or arm of the user, as well as transferring the tactile effect through a direct contact. Two or more haptic modules 154 may be provided according to the configuration of the mobile communication terminal 100.

The memory 160 may store software programs used for the processing and controlling operations performed by the controller 180, or may temporarily store data (e.g., a phonebook, messages, still images, or video) that are inputted or outputted. In addition, the memory 160 may store data regarding various patterns of vibrations and audio signals outputted when a touch is inputted to the touch screen.

The memory 160 can be implemented using any type of suitable storage medium, such as, for example, a Flash memory, a hard disk, a multimedia card micro type memory, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, or an optical disk. Also, the mobile communication terminal 100 may be operated in relation to a web storage device that performs the storage function of the memory 160 over the Internet.

The interface unit 170 serves as an interface with external devices connected with the mobile communication terminal 100. For example, the interface unit 170 may transmit data to an external device, receive data from an external device, receive and transmit power to each element of the mobile communication terminal 100, or transmit internal data of the mobile communication terminal 100 to an external device. For example, the interface unit 170 may include wired or wireless headset ports, external power supply ports, wired or wireless data ports, memory card ports, ports for connecting a device having an identification module, audio input/output (I/O) ports, video I/O ports, and earphone ports.

The identification module may be a chip that stores various information for authenticating the authority of using the mobile communication terminal 100. This information may include a user identity module (UIM), a subscriber identity module (SIM) a universal subscriber identity module (USIM), or other information. In addition, the device having the identification module (referred to as 'identifying device', hereinafter) may take the form of a smart card. Accordingly, the identifying device may be connected with the terminal 100 via a port. The interface unit 170 may be used to receive input (e.g., data, information, power, etc.) from an external device and transfer the received input to one or more elements within the mobile communication terminal 100 or may be used to transfer data between the mobile terminal and an external device.

When the mobile communication terminal 100 is connected with an external cradle, the interface unit 170 may serve as a passage to allow power from the cradle to be supplied there through to the mobile communication terminal 100 or may serve as a passage to allow various command signals inputted by the user from the cradle to be transferred to the mobile terminal there through. Various command signals or power inputted from the cradle may operate as signals for recognizing that the mobile communication terminal 100 is properly mounted on the cradle.

The controller 180 typically controls the general operations of the mobile terminal. For example, the controller 180 performs controlling and processing associated with voice calls, data communications, video calls, or other operations. The controller 180 may include a multimedia module 181 for reproducing multimedia data. The multimedia module 181 may be configured within the controller 180 or may be configured to be separated from the controller 180. Also, the controller 180 may perform a pattern recognition processing to recognize a handwriting input or a picture drawing input performed on the touch screen as characters or images, respectively.

The power supply unit 190 receives external power or internal power and supplies appropriate power required for operating respective elements and components under the control of the controller 180.

Various embodiments described herein may be implemented in a computer-readable medium using, for example, software, hardware, or a combination thereof. For hardware implementations, the embodiments described herein may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, or other electronic units designed to perform the functions described herein. In some implementations, functionality may be implemented by the controller 180 itself.

For software implementations, the techniques described below may be implemented by separate software modules. Each software module may perform one or more functions or operations described herein. Software codes can be implemented by a software application written in any suitable programming language. The software codes may be stored in the memory 160 and executed by the controller 180. In addition, a navigation session 182 applied to the mobile communication terminal 100 provides a general navigation function.

Meanwhile, the controller 180 applied to the mobile terminal 100 may convert operational states of a plurality of devices included in the controller of the mobile terminal upon generation of a preset event.

Also, the controller 180 of the mobile terminal 100 may control an operational state of a particular external terminal having a mutual communication connection upon generation of a preset event.

Figure 2:
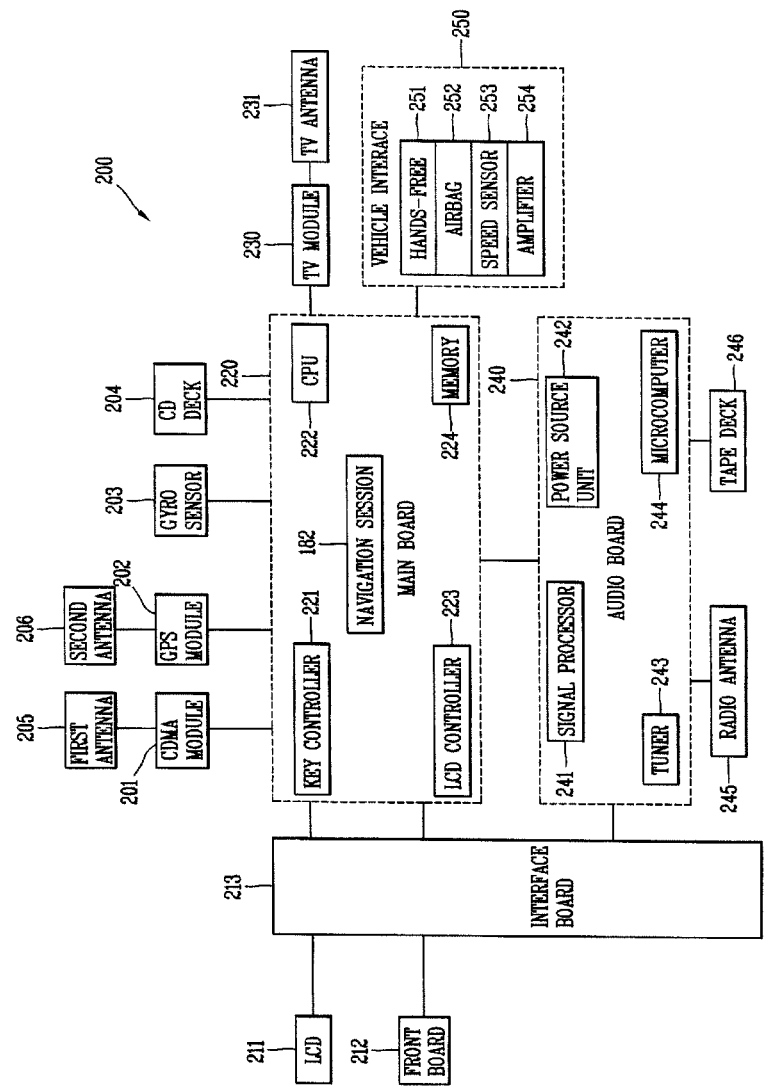
FIG. 2 is a block diagram showing an example configuration of a telematics terminal in accordance with the one embodiment of the present invention.

FIG. 2 is a block diagram showing a configuration of a telematics terminal 200. The telematics terminal 200 illustrates one exemplary configuration of a telematics terminal that may be used to carryout the functionality described in more detail below. In various implementations, a different configuration of a telematics terminal with other components may be used.

Referring to FIG. 2, the telematics terminal 200 may include a main board 220. The main board 220 includes a central processing unit (CPU) 222 for controlling overall operation of the telematics terminal 200, a key controller 221 for controlling a variety of key signals, an LCD controller 223 for controlling an LCD, and memory 224 for storing various kinds of information. In particular, the memory 224 stores map information (map data) for displaying vehicle guidance information (e.g., road guidance information for the user while the user is driving or not driving a vehicle) on a map of the display unit (e.g., LCD 211). In addition, the memory 224 stores a traffic information collection and control algorithm for allowing inputting of traffic information according to a present condition of a road on which the vehicle is currently traveling by a user.

The main board 220 may include a communication module 201 to provided with a uniquely given device number. The communication module 201 may be configured to perform a voice call and data transmission and/or reception through a mobile terminal built in a vehicle and may include a GPS module 202 for receiving a GPS signal to guide a position of a vehicle, tracking a traveling route from a depart point to an arrival point, generating current position data of a vehicle based on the received GPS signal, or transmitting traffic information collected by a user as a GPS signal. The communication module 201 may also include a gyro sensor 203 for sensing a running direction of the vehicle, a CD deck 204 for reproducing a signal recorded on a compact disk (CD), and other modules. The communication module 201 and the GPS module 202 transmit and/or receive signals through a first antenna 205 and a second antenna 206, respectively.

The main board 220 is connected to a TV module 230 for receiving a broadcast signal via a broadcast signal antenna (or TV antenna). The main board 220 is connected to an LCD display unit 211 controlled by the LCD controller 223 via an interface board 213. The LCD 211 processes a broadcasting signal received through the TV module 230 and then displays the processed broadcasting signal, in the form of a video signal, on the LCD 211 via the interface board 213 under control of the LCD controller 223. In addition, the LCD 211 outputs an audio signal through an amplifier 254 under control of an audio board 240 and displays each kind of video signal or text signal based on control signals of the LCD controller 223. As discussed above, the LCD 211 may also be configured to receive an input from a user via a touch screen.

In addition, the main board 220 is connected to a front board 212 controlled by the key controller 221 via the interface board 213. The front board 212 configures buttons (or keys) and menus for enabling an input of a variety of key signals, and provides a key signal corresponding to the key (or button) selected by the user to the main board 220. The front board 212 may be provided with a menu key for allowing a direct input of traffic information, and the menu key may be configured to be controlled by the key controller 221.

The audio board 240 is connected to the main board 220, and processes a variety of audio signals. The audio board 240 may include a microcomputer 244 for controlling the audio board 240, a tuner 243 for receiving a radio signal through an antenna (or radio antenna) 245, a power supply unit 242 for supplying power to the microcomputer 244, and a signal processing unit 241 for processing a variety of voice signals. The audio board 240 is connected to a radio antenna 245 for receiving radio signals, and a tape deck 246 for reproducing an audio tape. The audio board 240 is connected to an amplifier 254 for outputting audio signals that are processed in the audio board 240.

The amplifier 254 is connected to a vehicle interface 250. That is, the main board 220 and the audio board 240 are connected to the vehicle interface 250. A hands-free unit 251 for inputting an audio signal without the user having to use their hands to input information, an airbag 252 for providing passenger's safety, and a speed sensor 253 for sensing a vehicle speed are also included in the vehicle interface 250. In addition, the speed sensor 253 calculates a vehicle speed, and provides information relating to the calculated vehicle speed to the CPU 222. The function of the navigation session 182 applied to the telematics terminal 200 can include general navigation functions, such as, providing driving directions to the user.

Meanwhile, the CPU 222 may convert operational states of a plurality of devices included in the controller of the mobile terminal upon generation of a preset event. Additionally, the CPU 222 may control an operational state of a particular external terminal having a mutual communication connection upon generation of a preset event.

Hereinafter, description will be given in detail in the assumption that a mobile terminal 300 according to an embodiment of the present invention is applied to the telematics terminal 200, with reference to FIG. 3. Here, the mobile terminal according to the embodiment of the present invention may be applicable to various types of terminals, as well as the mobile terminal 100 and the telematics terminal 200. Examples of the various terminals may include a smart phone, a portable terminal, a mobile terminal, a personal digital assistant (PDA), a laptop computer, a Wibro terminal, an internet protocol television (IPTV) terminal, a telematics terminal, a navigation terminal, an audio video navigation (AVN) terminal, a television, an audio/video (A/V) system, a home theater system and the like.

Figure 3:
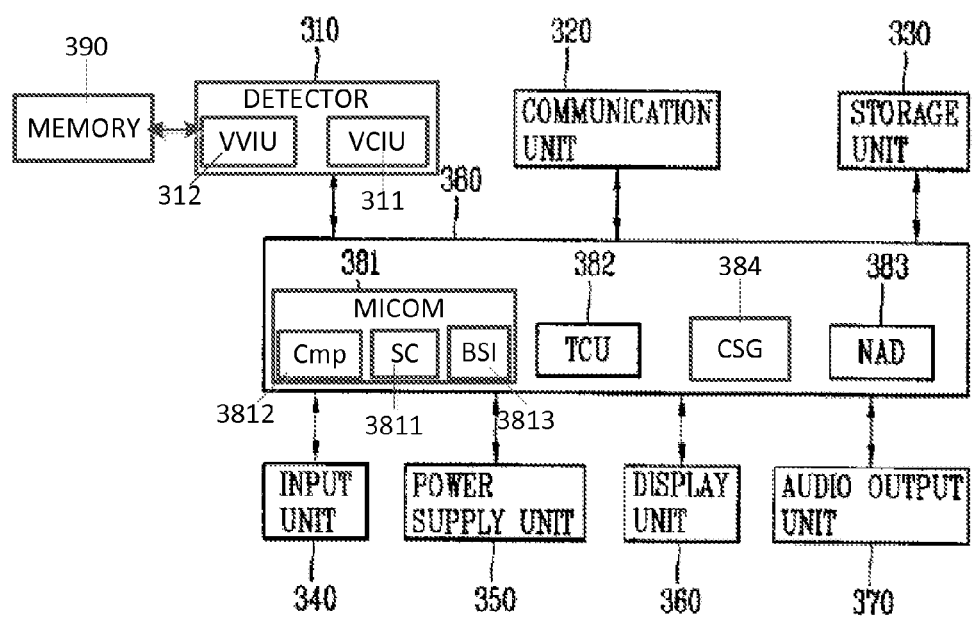
FIG. 3 is a block diagram showing an example configuration of a mobile terminal in accordance with an embodiment of the present invention.

FIG. 3 is a block diagram showing a configuration of a mobile terminal 300 in accordance with an embodiment of the present invention.

As illustrated in FIG. 3, the mobile terminal 300 may include a detector (or sensing unit) 310, a communication unit 320, a storage unit 330, an input unit 340, a power supply unit 350, a display unit 360, an audio output unit 370 and a controller 380. The configuration of FIG. 3 is exemplary, as the mobile terminal 300 may be implemented by greater or fewer components.

The detector 310 may detect (or sense) a voltage and/or current of each cell of a battery included in a battery management system (BMS) equipped in a vehicle or the like, in real time or at a preset time interval. Here, the battery included in the BMS may be configured either as a single device or as a pack of plural batteries (i.e., battery pack). Also, upon equipping a plurality of batteries in the BMS, the plurality of batteries may be connected in series, and at least one safety switch may be interposed among the plurality of batteries.

The detector 310 may also measure (or detect) temperature information of the battery (including an internal temperature of the battery, an ambient temperature and the like).

The communication unit 320 may be connected to the BMS within a vehicle via a wired/wireless communication network, to receive battery state related information sent from the BMS.

The communication unit 320 may also include at least one component which allows the communication between the mobile terminal 300 and the vehicle by use of a controller area network (CAN) as a vehicle network system or a short-range communication network.

Also, the communication unit 320 may perform a communication function between the mobile terminal 300 and an external terminal via the wired/wireless communication network. Here, examples of a wireless internet technique may include wireless LAN (WLAN), Wi-Fi, Wireless Broadband (Wibro), World Interoperability for Microwave Access (Wimax), High Speed Downlink Packet Access (HSDPA), IEEE 802.16, Long Term Evolution (LTE), Wireless Mobile Broadband Service (WMBS) and the like. Also, examples of the short-range communication technique may include Bluetooth, Radio Frequency Identification (RFID), Infrared Data Association (IrDA), Ultra Wideband (UWB), Zigbee and the like. Also, examples of the external terminal may include a mobile terminal, a telematics terminal, a smart phone, a portable terminal, a personal digital assistant (PDA), a portable multimedia player (PMP) terminal, a computer, a Wibro terminal, an Internet protocol television (IPTV) terminal, a navigation terminal, an audio video navigation (AVN) terminal, an audio/video (A/V) system, an information provisioning center, a call center and the like.

Furthermore, the communication unit 320 may transceive various types of information with a vehicle having a communication connection or with a particular external terminal.

The storage unit 330 may store data and programs required for operations of the mobile terminal 300. The storage unit 330 may also store various user interfaces (UIs) and/or graphic user interfaces (GUIs). The storage unit 330 may also store information related to a preset threshold value and the like.

The storage unit 330 may be implemented using any type or combination of suitable memory or storage medium including a flash memory type, a hard disk type, a multimedia card micro type, a card type (SD or XD memory), read-only memory (ROM), electrically erasable programmable read-only memory (EEPROM), programmable read-only memory (PROM), random access memory (RAM), static random access memory (SRAM), magnetic memory, magnetic or optical disk.

The input unit 340 may receive a signal responsive to a user's button manipulation or selection of a particular function, or receive a command or control signal generated by a manipulation such as touching/scrolling of a displayed screen. The input unit 340 may also receive a signal corresponding to information input by a user, and be configured by using various devices, such as a keypad, a touch screen, a jog & shuttle, a mouse, a stylus pen, a touch pen and the like.

The power supply unit 350 may store (or charge) power supplied from an external power source or the like. Here, the power supply unit 350 may be provided with power from the external power source by a wired/wireless charging algorithm. That is, the power supply unit 350 may be connected directly to the external power source via a component such as a power outlet. Alternatively, the power supply unit 350 and the external power source are equipped with a transmission/reception unit, respectively, so as to urge charging of the power supply unit 350 by using one of a magnetic resonance coupling method, an electromagnetic induction method or a radiowave method, between the corresponding transmission/reception units. That is, the power supply unit 350 and the external power source may be configured to allow a wireless charging. Upon the wireless charging, the construction of the reception unit and the transmission unit may be easily designed by a person skilled in the art, so the corresponding functions can be executed.

Additionally, the power supply unit 350 may include a battery configured as a single device or include a plurality of batteries, for example, as a battery pack. Upon including the plurality of batteries, the power supply unit 350 may be configured such that the plurality of batteries are connected in series, and at least one safety switch may be interposed among the plurality of batteries. The power supply unit 350 may supply power to a plurality of devices included in the controller 380 under the control of the controller 380. The power supply unit 350 may also supply power to a vehicle having a wired/wireless communication connection with the mobile terminal 300 or an external terminal under the control of the controller 380.

The display unit 360 may output (or display) an operational state of each component of the mobile terminal 300 under the control of the controller 380. The display unit 360 may also output an execution result of an application program previously stored in the storage unit 330 under the control of the controller 380. Here, the display unit 360 may be configured to receive a signal responsive to a user's input in a touch screen manner.

Furthermore, the display unit 360 may display various content, such as various menu screens and the like, using UIs and/or GUIs stored in the storage unit 330 upon displaying the execution result of the application program. Here, the content output on the display unit 360 may include menu screens for outputting various text or image data (including map data or other types of information data), and data such as icons, list menus, combo boxes and the like. The display unit 360 may be implemented using at least one of display technologies including, for example, a liquid crystal display (LCD), a thin film transistor-liquid crystal display (TFT-LCD), an organic light-emitting diode display (OLED), a flexible display and a three-dimensional display.

The audio output unit 370 may output audio information included in a signal which was processed by the controller 380. Here, the audio output unit 370 may be a speaker. The audio output unit 370 may output audio information included in the execution result of the application program under the control of the controller 380.

The controller 380 may control an overall operation of the mobile terminal 300. The controller 380 may also be subdivided into a plurality of devices for each function to be performed. That is, the controller 380 may include a micro computer (micom) 381, a telematics control unit (TCU) 382, a network access device (NAD) 383 and the like. Here, under a sleep mode or a task mode, the micom 381 may performs various functions, examples of which may include monitoring of the change in a voltage of the battery included in the BMS, interfacing between the TCU 382 and a crash sensing module (CSM), controlling of the display unit 360, power control for devices, such as the TCU 382 and the NAD 383 included in the mobile terminal 300, and the like. Also, the TCU 382 may execute a function of transceiving information with a vehicle having the BMS by using the CAN. Also, the NAD 383 may execute a call connection function (or communication function) between the mobile terminal 300 and a particular mobile terminal.

The operational state of the micom 381 may be converted by a state converter (SC) 3811 from a sleep mode into a task mode upon detection of a voltage variation of the battery mounted in a vehicle by means of the detector 310. In some implementations, the detector 310 can detect a voltage variation by accessing, from a memory 390, stored voltage information relating to a voltage of the battery during a past time period. For example, a voltage characteristic identification unit (VCIU) 311 of the detector 310 can detect the voltage of the battery at regular time intervals (e.g., every 0.1 seconds) and store the detected voltage information. The detector 310 can retrieve voltage information for a previous time period (e.g., the time period proceeding a current time period) and compare the retrieved voltage information to a current voltage of the battery. If it is determined that the previous voltage and the current voltage are different, a voltage variation identification unit (VVIU) 312 of the detector 310 can identify this difference as a voltage variation.

Upon generation of a preset event, the operational state of the micom 381 may also be converted from the sleep mode into the task mode. Here, the preset event may be one of detection of the voltage variation of the battery equipped in a vehicle by means of the detector 310, selection of a preset first button of the mobile terminal 300 (or reception of a first signal responsive to the input/selection of the preset first button), selection of a preset second button of the mobile terminal 300 responsive to a call connection request from a particular external mobile terminal (or reception of a second signal responsive to input/selection of the preset second button), and reception of a random signal sent from a vehicle connected via the communication unit 320.

The operational state of the micom 381 may be converted from a sleep mode into a task mode when detecting a battery voltage variation included in battery state related information received from the BMS via the communication unit 320. The micom 381 may also convert the operational states of the TCU 382 and the NAD 383 from an OFF state into an operation mode if the battery voltage is determined, through use of a comparator (CMP) 3812, to be higher than a preset threshold value.

Also, if the battery voltage is determined by the CMP 3812 to be lower than or equal to the preset threshold value, the micom 381 may convert the operational states of the TCU 382 and the NAD 383 from the operation mode into an OFF state and a preset mode (e.g., a discontinuous reception (DRx) mode), respectively. After converting the operational states of the TCU 382 and the NAD 383 into the OFF state and the preset mode, the micom 381 may be converted into the sleep mode.

Also, in a state of non-detection of the battery voltage variation (e.g., a case of maintaining 12V of the battery voltage as a standby state) after the conversion into the task mode due to the generation of the preset event, the micom 381 may perform a specific function of the mobile terminal 300 (e.g., a call connection function with a particular external terminal using the NAD 383) and thereafter convert its own operational state and the operational states of the TCU 382 and the NAD 383 into the sleep mode, the OFF mode and the DRx mode, respectively. 4

In addition, when the detector 310 detects the voltage variation of the battery equipped in the vehicle, the controller 380 may convert the operational state of the micom 381 from the sleep mode into the task mode. If the battery voltage is higher than the preset threshold value, the controller 380 determines this state as a power-on state of the vehicle having the battery, and accordingly a control signal generator (CSG) 384 generates a control signal for controlling power of at least one mobile terminal having a communication connection with the vehicle or the mobile terminal 300 by use of a short-range communication network or CAN. Here, the control signal may include information necessary to convert the operational state of the at least one mobile terminal from an OFF mode (or a standby mode) into an operation mode (or an application mode).

The controller 380 may also send the generated control signal to the at least one mobile terminal via the communication unit 320. Upon reception of the control signal sent by the controller 380, the at least one mobile terminal may be converted from the OFF mode into the operation mode based upon the received control signal.

The controller 380 may monitor the battery voltage variation. If the battery voltage becomes lower than or equal to the preset threshold value, the controller 380 generates a second control signal for converting the operational state of the at least one mobile terminal from the operation mode into the OFF mode (or a preset mode), and then sends the generated second control signal to the at least one mobile terminal via the communication unit 320. Upon reception of the second control signal from the controller 380, the at least one mobile terminal may be converted from the operation mode into the OFF mode (or a preset mode) based upon the received second control signal.

As such, a mobile terminal connected to a BMS may monitor a voltage variation of a battery equipped in the BMS, and if the battery voltage variation is detected, it may convert an operational state of a controller provided therein into an operation mode. Here, the controller may be configured to include a plurality of devices executing particular functions, respectively, and utilize a specific device of the plurality of devices to control the operational states of the other devices.

Also, the mobile terminal connected to the BMS may monitor the voltage variation of the battery equipped in the BMS, and if a battery voltage variation is detected, it may convert the operational state of the controller provided therein into the operation mode and control an operational state of at least one mobile terminal having a communication connection with a vehicle having the BMS or the mobile terminal.

In addition, the mobile terminal connected to the BMS may monitor the voltage variation of the battery equipped in the BMS, so as to determine a power state (e.g., ON/OFF state) of the vehicle even when the power state of the vehicle is not determined by using an accessory signal (ACC).

Hereinafter, a control method for a mobile terminal according to the present invention will be described in detail with reference to FIGS. 1 to 11.

Figure 4:
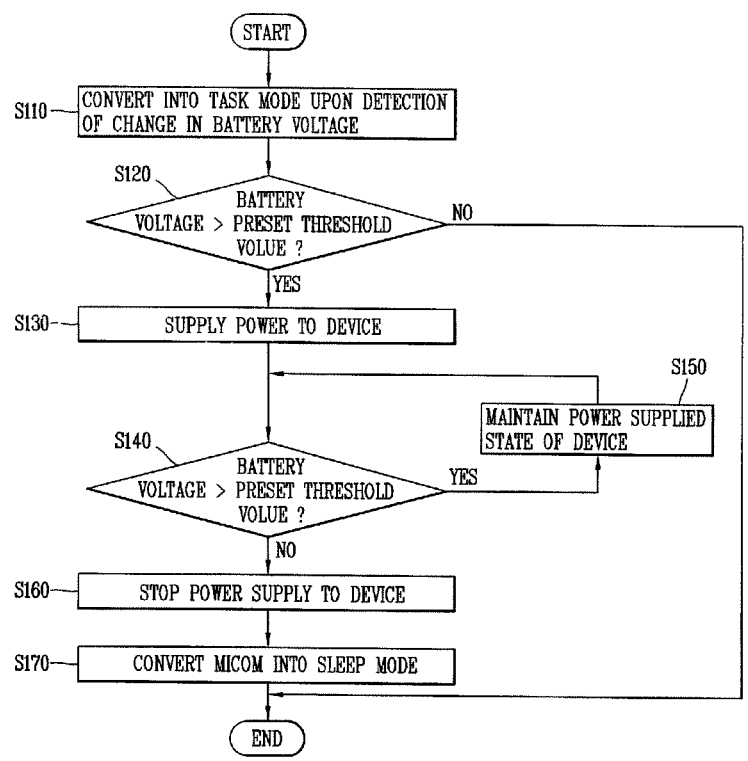
FIG. 4 is a flowchart showing an example control method for a mobile terminal in accordance with a first embodiment of the present invention.

FIG. 4 is a flowchart showing a control method for a mobile terminal in accordance with a first embodiment of the present invention.

First, when the detector 310 detects (or senses) a voltage variation of a battery equipped within a vehicle, the operational state of the micom 381 is converted from a sleep mode into a task mode (S110). Here, the micom 381 may perform several functions, such as monitoring of the battery voltage variation, interfacing between TCU and CSM, controlling of the display unit 360, power control of the TCU and NAD, and the like.

Figure 5:
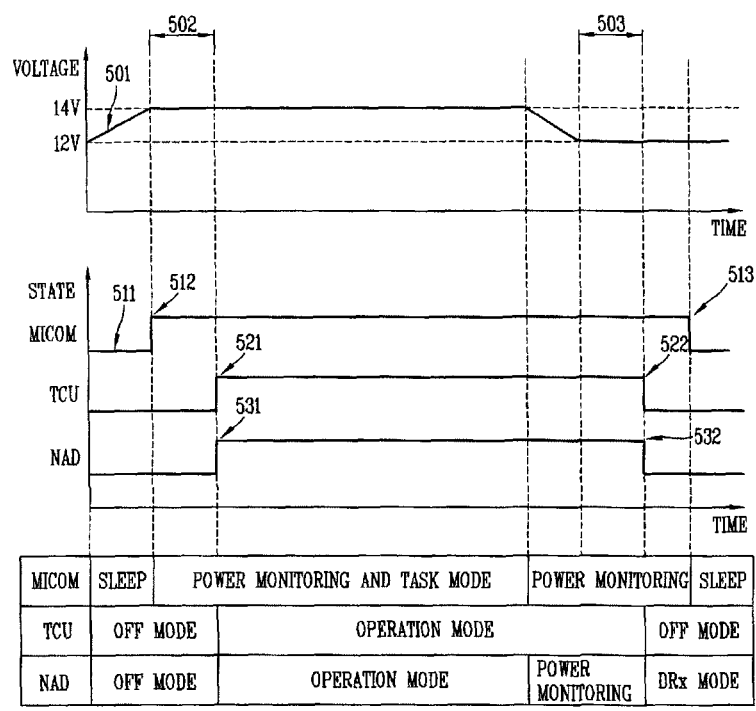
FIG. 5 is a view showing an example voltage variation and an operational state of a controller in accordance with the first embodiment of the present invention.

As one example, referring to FIG. 5, when the detector 310 detects the battery voltage variation in the sleep mode 511, the micom 381 is converted from the sleep mode 511 into a task mode 512. 5

The communication unit 320 receives battery state related information sent from a BMS within the vehicle. Afterwards, the micom 381 may be converted from the sleep mode into the task mode based upon the battery state related information received. That is, the micom 381 monitors the battery voltage included in the battery state related information sent from the BMS, and if any change is detected from the battery voltage by a battery state identifier (BSI) 3813, the operational state of the micom 381 is converted from the sleep mode into the task mode (S110).

The micom 381 then determines whether the battery voltage is higher than a preset threshold value (S120).

Here, the micom 381 may determine whether the battery voltage is kept higher than the preset threshold value for a preset first time. That is, the micom 381 may be configured to determine whether the state in which the battery voltage is higher than the preset threshold value is retained for the preset first time, in order to identify whether the voltage variation of the battery within the BMS is temporary (e.g., a case where the battery voltage variation is temporarily generated due to a particular event) or is generated for substantially supplying power to the vehicle or the like (S120).

If the state in which the battery voltage is higher than the preset threshold value is retained for the preset time according to the determination result, the micom 381 identifies this situation as a power-on state of the vehicle having the battery, so as to supply power to the TCU 382 and the NAD 383, thereby operating (converting) the TCU 382 and the NAD 383 in the operation mode. Here, the TCU 382 may perform a transmission and reception function of information with the vehicle via a CAN, and the NAD 383 may perform a call connection function (or communication function) between the mobile terminal 300 and a particular mobile terminal.

As one example, referring to FIG. 5, if the battery voltage (e.g., 14V) is kept higher than a preset threshold value (e.g., 12.5V) for a preset time (e.g., 3 seconds) (see 502), the micom 381 controls the power supply unit 350 so as to supply power to the TCU 382 and the NAD 383 which are in an OFF state (see 521 and 531).

Also, if the battery voltage is kept higher than the preset threshold value for the preset time according to the determination result, the micom 381 identifies whether the TCU 382 and the NAD 383 are in a power-on state. Accordingly, the micom 381 may control the power supply unit 350 to supply power to a device in a power-on state of the TCU 382 and the NAD 383 (S130).

Afterwards, the micom 381 determines whether a battery voltage, which is detected by the detector 310 in real time or at a preset time interval, is higher than the preset threshold value (S140).

If the detected battery voltage is higher than the preset threshold value according to the determination, the micom 381, the TCU 382 and the NAD 383 may continuously perform their own functions. That is, the micom 381 controls the power supply unit 350 to keep supplying power to the TCU 382 and the NAD 383 (S150).

If the detected battery voltage is lower than or equal to the preset threshold value according to the determination, the micom 381 determines this situation as a power-off state of the vehicle having the battery. Accordingly, the micom 381 turns the TCU 382 off and converts the NAD 383 into a preset mode (e.g. DRx mode). Here, the DRx mode indicates a discontinuous reception mode.

Here, the micom 381 may determine whether the battery voltage is kept lower than or equal to the preset threshold value for a preset second time. That is, the micom 381 may be configured to determine whether the battery voltage is kept lower than or equal to the preset threshold value for the preset second time, in order to determine whether the voltage variation of the battery is temporary (e.g., a case where the battery voltage variation is temporarily generated due to a particular event) or the vehicle is substantially in a power-off state.

As one example, referring to FIG. 5, if a battery voltage (e.g., 12V) is kept lower than a preset threshold value (e.g., 12.5V) for a preset time (e.g., 3 seconds) (see 503), the micom 381 controls the power supply unit 350 to stop the power supply to the TCU 382 (see 522) and converts the NAD 383 into the DRx mode (see 532).

If the battery voltage variation is detected, the NAD 383 is converted from the operation mode into a mode of monitoring the battery voltage. If the power-off state of the vehicle is identified by the micom 381, the NAD 383 is converted into a preset mode by control of the micom 381. That is, functionality of the NAD 383 in the preset mode may include the function of monitoring the battery voltage variation (S160).

Afterwards, the micom 381 is converted into a sleep mode, and monitors whether any battery voltage variation is detected by the detector 310.

As one example, after the TCU 382 and the NAD 383 are converted into preset modes (e.g., OFF mode or DRx mode) (see 522 and 532 of FIG. 5), the micom 381 is converted into the sleep mode and monitors whether the battery voltage variation is detected by the detector 310 (S170).

Figure 6:
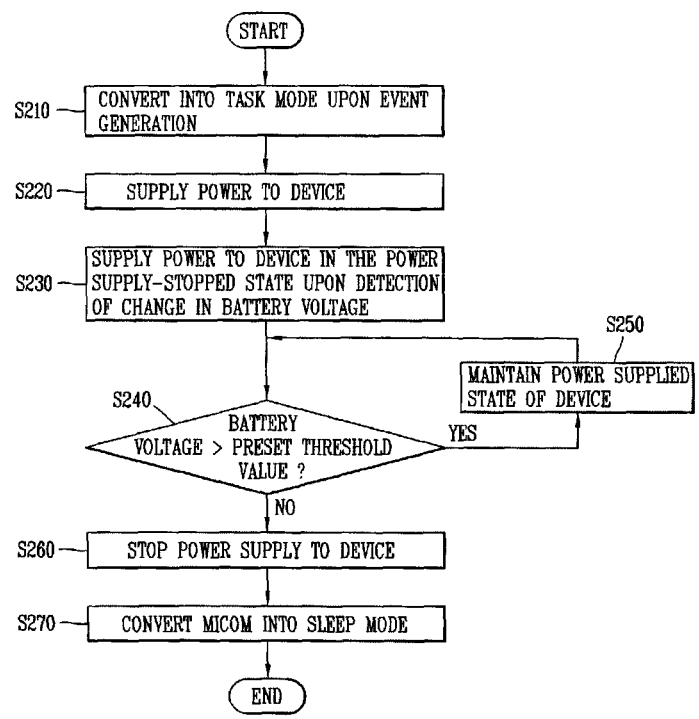
FIG. 6 is a flowchart showing an example control method for a mobile terminal in accordance with a second embodiment of the present invention.

FIG. 6 is a flowchart showing a control method for a mobile terminal in accordance with a second embodiment of the present invention.

First, upon an event generation in a sleep mode, the operational state of the micom 381 is converted from a sleep mode into a task mode. Here, the event may be one of detection of a voltage variation of the battery equipped in a vehicle by means of the detector 310, selection of a preset first button of the mobile terminal 300, selection of a preset second button of the mobile terminal 300 responsive to a call connection request from a particular external mobile terminal, and reception of a random signal sent from a vehicle connected via the communication unit 320. Also, the micom 381 may perform several functions, such as monitoring of the battery voltage variation, interfacing between TCU and CSM, controlling of the display unit 360, power control of the TCU and NAD, and the like.

Figure 7:
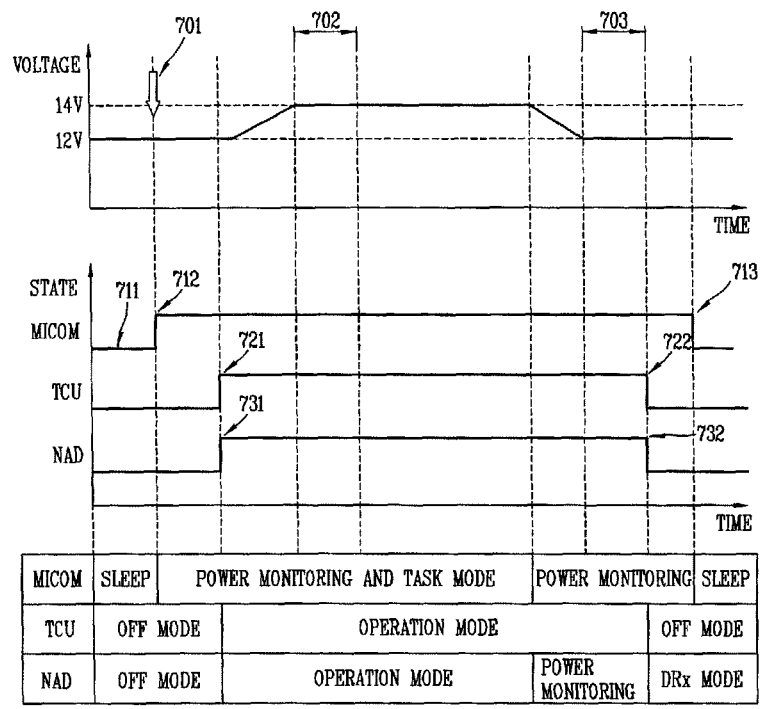
FIG. 7 is a view showing an example voltage variation and an operational state of a controller in accordance with the second embodiment of the present invention.

As one example, referring to FIG. 7, upon an event generation (701) in a sleep mode (711), the operational state of the micom 381 is converted from the sleep mode (711) into a task mode (712) (S210).

Afterwards, the micom 381 supplies power to the TCU 382 and the NAD 383 to operate (convert) the TCU 382 and the NAD 383 in an operation mode. As one example, referring to FIG. 7, after the operational state of the micom 381 is converted into the task mode (712), the micom 381 controls the power supply unit 350 to supply power to the TCU 382 and the NAD 383 (721 and 731). Here, the TCU 382 may perform a transmission and reception function of information with the vehicle via a CAN, and the NAD 383 may perform a call connection function (or communication function) between the mobile terminal 300 and a particular mobile terminal (S220).

The detector 310 can detect a voltage variation of the battery equipped within the vehicle. Also, the communication unit 320 may receive battery state related information sent from the BMS within the vehicle. The micom 381 then determines whether the detected battery voltage or a battery voltage included in the received battery state related information is higher than a preset threshold value.

Here, the micom 381 may determine whether the battery voltage is kept higher than the preset threshold value for a preset first time. That is, the micom 381 may be configured to determine whether the state in which the battery voltage is higher than the preset threshold value is retained for the preset first time, in order to identify whether the voltage variation of the battery within the BMS is temporary (e.g., a case where the battery voltage variation is temporarily generated due to a particular event) or is generated for substantially supplying power to the vehicle or the like.

If the battery voltage is kept higher than the preset threshold value for the preset first time according to the determination result, the micom 381 identifies this situation as a power-on state of the vehicle having the battery. Afterwards, the micom 381 determines whether the TCU 382 and the NAD 383 are in a power-on state, and controls the power supply unit 350 to supply power to a device in a power-off state of the TCU 382 and the NAD 383.

As one example, if the battery voltage (e.g., 14V) is kept higher than the preset threshold value (e.g., 12.5V) for the preset time (e.g., 3 seconds) (see 701 of FIG. 7), the micom 381 determines whether the TCU 382 and the NAD 383 are in a power-on state, and controls the power supply unit 350 to supply power to a device in a power-off state of the TCU 382 and the NAD 383 (S230).

Afterwards, the micom 381 determines whether a battery voltage detected by the detector 310 in real time or at a preset time interval is higher than the preset threshold value (S240).

If the detected battery voltage is higher than the preset threshold value, the micom 381, the TCU 382 and the NAD 383 continuously execute their own functions. That is, the micom 381 controls the power supply unit 350 to keep supplying power to the TCU 382 and the NAD 383 (S250).

If the detected battery voltage is lower than or equal to the preset threshold value according to the determination, the micom 381 identifies this situation as a power-off state of the vehicle having the battery. Accordingly, the micom 381 turns the TCU 382 off and converts the NAD 383 into a preset mode (e.g. DRx mode). Here, the DRx mode indicates a discontinuous reception mode.

Here, the micom 381 may determine whether the battery voltage is kept lower than or equal to the preset threshold value for a preset second time. That is, the micom 381 may be configured to determine whether the battery voltage is kept lower than or equal to the preset threshold value for the preset second is time, in order to determine whether the voltage variation of the battery is temporary (e.g., a case where the battery voltage variation is temporarily generated due to a particular event) or the vehicle is substantially in a power-off state.

As one example, referring to FIG. 7, if a battery voltage (e.g., 12V) is kept lower than a preset threshold value (e.g., 12.5V) for a preset time (e.g., 3 seconds) (see 503), the micom 381 controls the power supply unit 350 to stop the power supply to the TCU 382 (see 722) and converts the NAD 383 into the DRx mode (see 732).

If the battery voltage variation is detected, the NAD 383 is converted from the operation mode into a mode of monitoring the battery voltage. If the power-off state of the vehicle is identified by the micom 381, the NAD 383 is converted into a preset mode by control of the micom 381. That is, functionality of the NAD 383 may include the function of monitoring the battery voltage variation (S260).

Afterwards, the micom 381 is converted into a sleep mode, and monitors whether any battery voltage variation is detected by the detector 310. As one example, after the TCU 382 and the NAD 383 are converted into preset modes (e.g., OFF mode or DRx mode) (see 722 and 732 of FIG. 5), the micom 381 is converted into the sleep mode and monitors whether the battery voltage variation is detected by the detector 310 (S270).

Figure 8:
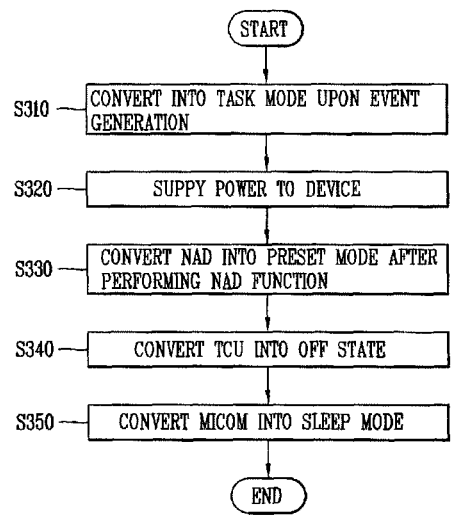
FIG. 8 is a flowchart showing an example control method for a mobile terminal in accordance with a third embodiment of the present invention.

FIG. 8 is a flowchart showing a control method for a mobile terminal in accordance with a third embodiment of the present invention.

First, upon an event generation in a sleep mode, the operational state of the micom 381 is converted from a sleep mode into a task mode. Here, the event may be one of detection of the voltage variation of the battery equipped in a vehicle by means of the detector 310, selection of a preset first button of the mobile terminal 300, selection of a preset second button of the mobile terminal 300 responsive to a call connection request from a particular external mobile terminal, and reception of a random signal sent from a vehicle connected via the communication unit 320. Also, the micom 381 may perform several functions, such as monitoring of the battery voltage variation, interfacing between TCU and CSM, controlling of the display unit 360, power control of the TCU and NAD, and the like.

As one example, referring to FIG. 7, upon an event generation (901) in a sleep mode (911), the operational state of the micom 381 is converted from the sleep mode (911) into a task mode (912) (S310). Afterwards, the micom 381 supplies power to the TCU 382 and the NAD 383 to operate (convert) the TCU 382 and the NAD 383 in an operation mode.

Figure 9:
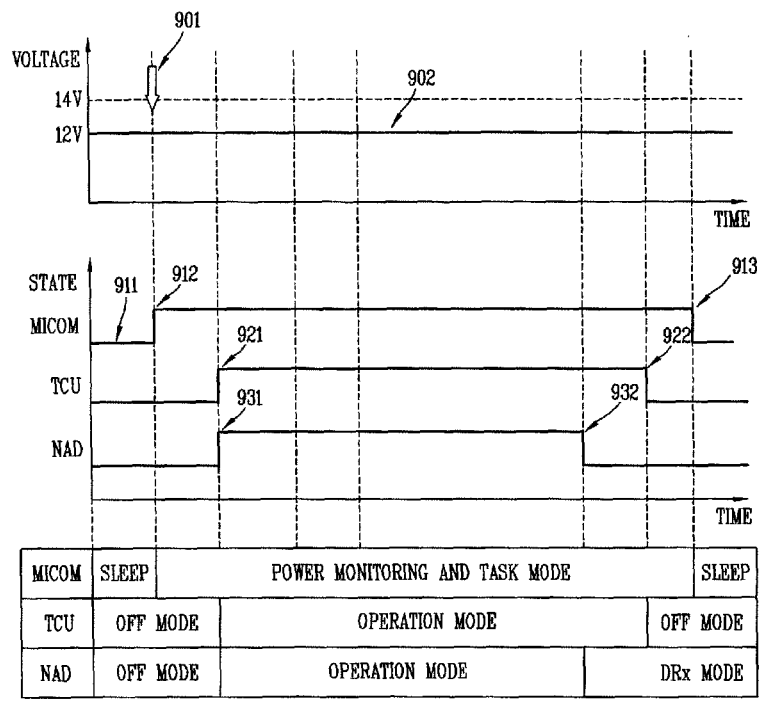
FIG. 9 is a view showing an example voltage variation and an operational state of a controller in accordance with the third embodiment of the present invention.

As one example, referring to FIG. 9, after the operational state of the micom 381 is converted into the task mode (912), the micom 381 controls the power supply unit 350 to supply power to the TCU 382 and the NAD 383 (921 and 931). Here, the TCU 382 may perform a transmission and reception function of information with the vehicle via a CAN, and the NAD 383 may perform a call connection function (or communication function) between the to mobile terminal 300 and a particular mobile terminal (S320).

Afterwards, after completion of the preset function (e.g. the call connection function), the NAD 383 is converted into a preset mode (e.g., DRx mode).

As one example, referring to FIG. 9, after performing the call connection function as the preset function with an external terminal, the NAD 383 is converted from the operation mode (931) into the DRx mode (932). Also, upon the conversion into the DRx mode, the NAD 383 provides information relating to the mode conversion to the TCU 382 (S330).

If the TCU 382 monitors the operational state of the NAD 383 to identify the mode conversion state of the NAD 383 (e.g., the conversion from the operation mode into the DRx mode), the TCU 382 is converted from the operation mode into an OFF mode.

As one example, referring to FIG. 9, the TCU 382 receives information relating to the mode conversion (e.g., information relating to the mode conversion from the operation mode into the DRx mode) sent from the NAD 383, so as to be converted from the operation mode (921) into the OFF mode (922) based upon the received information. Also, upon the conversion into the OFF mode, the TCU 382 provides information relating to the mode conversion to the micom 381 (S340).

Afterwards, the micom 381 monitors the operational state of the TCU 382 to identify the mode conversion state (e.g., conversion from the operation mode into the OFF mode) of the TCU 382, thereby being converted from the task mode into the sleep mode.

As one example, referring to FIG. 9, the micom 381 receives information related to the mode conversion (e.g., the conversion from the operation mode into the OFF mode) sent from the TCU 382. Accordingly, the micom 381 is converted from the task mode (912) into the sleep mode (913) based upon the received information (S350).

Also, during those processes, referring to FIG. 9, a non-detected state of the voltage variation of the battery within the vehicle is retained (e.g., a state of maintaining a constant value of 12V (see 902)), a specific function (e.g., a call connection function with a random terminal) of the mobile terminal 300 may be performed.

Figure 10:
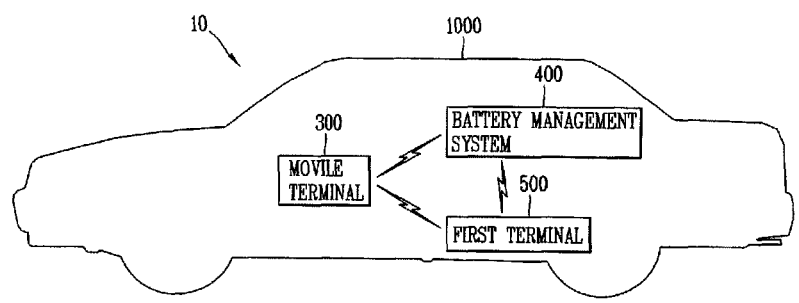
FIG. 10 is a block diagram showing an example configuration of a mobile terminal system in accordance with one embodiment of the present invention.

FIG. 10 is a block diagram showing a configuration of a mobile terminal system in accordance with one embodiment of the present invention. As illustrated in FIG. 10, a mobile terminal system 10 may include a mobile terminal 300, a battery management system (BMS) 400 and a first terminal 500. Here, the mobile terminal 300, the battery management system (BMS) 400 and the first terminal 500 may be equipped in a vehicle 1000.

The mobile terminal 300 may be configured as one of a mobile terminal, a telematics terminal, a smart phone, a portable terminal, a personal digital assistant (PDA), a portable multimedia player (PMP) terminal, a computer, a Wibro terminal, an Internet protocol television (IPTV) terminal, a navigation terminal, an audio video navigation (AVN) terminal, an audio/video (A/V) system and the like. Also, the mobile terminal 300 may be disposed within the vehicle 1000 having the BMS 400 or located adjacent to the vehicle 1000.

The mobile terminal 300 and the BMS 400 may be connected to each other by employing one of wired and wireless communication techniques. Here, examples of the wired and wireless communication techniques may include wireless LAN (WLAN), Wi-Fi, Wireless Broadband (Wibro), World Interoperability for Microwave Access (Wimax), High Speed Downlink Packet Access (HSDPA), Long Term Evolution (LTE), IEEE 802.16, Wireless Mobile Broadband Service (WMBS), Bluetooth, Radio Frequency Identification (RFID), Infrared Data Association (IrDA), Ultra Wideband (UWB), Zigbee, power line communication (PLC), broadband communication network and the like.

Also, the mobile terminal 300 may detect state information related to a battery equipped in the BMS 400. Here, the battery state related information may include at least one of a state of charge (SOC) of the battery, a voltage value, a current value, temperature information (e.g., temperature of the battery or ambient temperature), battery-specific information, and a battery-specific number. Also, the battery-specific information may include one of a rate capacity, a rate voltage and a rate current of a reference battery.

The mobile terminal 300 may also perform an authentication process with the BMS 400 and the first terminal 500, respectively. The mobile terminal 300 and the first terminal 500 may be connected to each other by one of wired and wireless communication techniques.

In addition, the mobile terminal 300 may generate a first control signal for controlling power of at least one device included in the first terminal 500 based upon a voltage variation included in the battery state related information detected from the BMS 400, and send the generated first control signal to the first terminal 500. Here, the first control signal may include information necessary to convert the at least one device from an OFF mode (or a standby mode) into an operation mode (or application mode).

Also, in a normally operating state of the first terminal 500, the mobile terminal 300 generates a second control signal for controlling power of at least one device included in the first terminal 500 based upon a voltage variation of the battery included in the BMS 400 and then sends the generated second control signal to the first terminal 500. Here, the second control signal may include information necessary to convert the at least one device from an operation mode (or application mode) into an OFF state (or a preset mode).

The BMS 400 may be equipped in the vehicle 1000, and configured to detect a voltage of the battery included in the BMS 400. The BMS 400 may send information related to the detected voltage of the battery to the mobile terminal 300. The BMS 400 may be configured such that the mobile terminal 300 detects the voltage of the battery. The BMS 400 may supply power to the first terminal 500 or stop the power supply thereto based upon the control signal (e.g., the first control signal or the second control signal) sent from the mobile terminal 300.

The first terminal 500 may be provided within the vehicle 1000, and examples of the first terminal 500 may include a navigation device, AVN terminal, A/V system, PDA, a mobile terminal, a PMP terminal and the like, each having a communication connection with the vehicle 100.

The first terminal 500 may convert the operational state of each device (e.g., navigation device, AVN terminal, A/V system, PDA, a mobile terminal, a PMP terminal and the like) disposed in the first terminal 100 from an OFF mode (or a standby state) into an operation mode (or an application mode) or vice versa, based upon the control signal (e.g., the first control signal or the second control signal) sent from the mobile terminal 300. Here, each device of the first terminal 500 may be provided with a battery, so the first terminal 500 may control each battery based upon the received control signal so as to convert the operational state of each of the devices.

Also, the first terminal 500 may control an operational state of each device provided therein by using power supplied from the BMS 400 based upon the control signal sent from the mobile terminal 300.

Hence, the mobile terminal 300 may monitor a voltage variation of the battery within the BMS 400. If the voltage variation of the battery is detected, the mobile terminal 300 may generate a control signal, and accordingly control power of at least one terminal connected to the BMS 400 or the mobile terminal 300 based upon the generated control signal.

Figure 11:
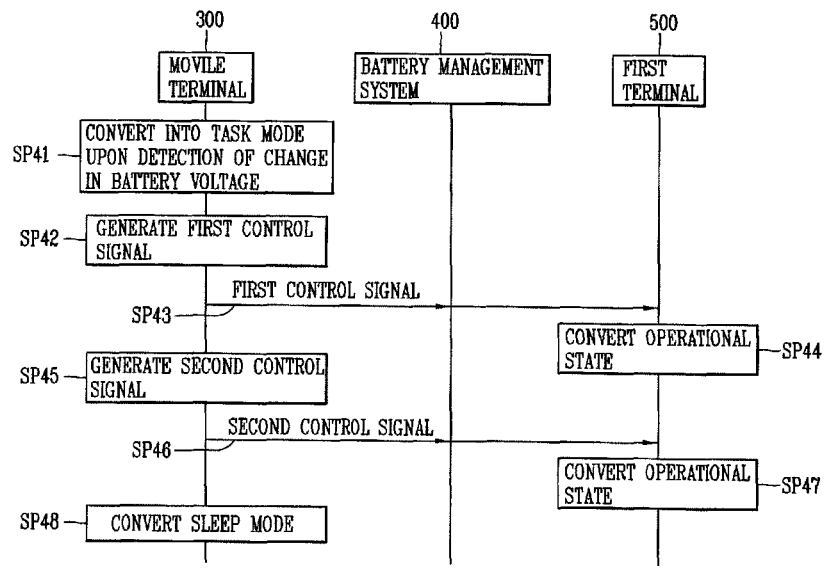
FIG. 11 is a signal flowchart showing an example communication process of the mobile terminal system in accordance with the one embodiment of the present invention.

FIG. 11 is a signal flowchart showing a communication process of the mobile terminal system in accordance with the one embodiment of the present invention.

First, if a voltage variation of the battery included in the BMS 400 within the vehicle 1000 is detected by the detector 310 of the mobile terminal 300, the operational state of the mobile terminal 300 is converted from a sleep mode into a task mode. The mobile terminal 300 may also receive battery state related information sent from the BMS 400, and be converted from the sleep mode into the task mode based upon a voltage variation of the battery included in the received battery state related information (SP41).

Afterwards, the mobile terminal 300 determines whether the battery voltage is higher than a preset threshold value. If the battery voltage is higher than the preset threshold value, the mobile terminal 300 identifies this situation as a power-on state of the vehicle 1000 having the battery, so as to generate a first control signal for controlling power of the first terminal 500 having a communication connection with the vehicle 1000 or the mobile terminal 300 via a short-range communication network or CAN. Here, the first control signal may include information for converting the operational state of the at least one terminal included in the first terminal 500 from an OFF mode (or a standby mode) into an operation mode (or an application mode). Here, the at least one terminal included in the first terminal 500 may be at least one of a navigation device, an AVN terminal, an A/V system, PDA, a mobile terminal, a PMP terminal and the like.

Also, upon the comparison between the battery voltage and the preset threshold value, the mobile terminal 300 may be configured to determine whether the battery voltage is kept higher than the preset threshold value for a preset first time, in order to determine whether the voltage variation of the battery within the BMS 400 is temporary (e.g., a case where the battery voltage variation is temporarily generated due to a particular event) or is generated for substantially supplying power to the vehicle or the like. If the state in which the battery voltage is higher than the preset threshold value is retained for the preset first time, the mobile terminal 300 identifies this situation as a power-on state of the vehicle 1000 having the battery, so as to generate a first control signal for controlling power of the first terminal 500 having a communication connection with the vehicle 1000 or the mobile terminal 300 via a short-range communication network or CAN (SP42).

The mobile terminal 300 sends the generated first control signal to the BMS 400 or the first terminal 500 (SP43).

The first terminal 500 accordingly receives the first control signal from the mobile terminal 300, and converts the operational state of at least one terminal included therein from an OFF mode (or a standby mode) into an operation mode (or an application mode) based upon the received first control is signal.

As one example, the first terminal 500 may convert the operational state of the navigation device included therein into the operation mode by using a battery included in the navigation device based upon the first control signal sent from the mobile terminal 300.

Also, upon reception of the first control signal from the mobile terminal 300, the BMS 400 supplies power stored in the battery equipped therein to the first terminal 500 based upon the received first control signal, thereby converting the operational state of at least one terminal included in the first terminal 500 from the OFF mode (or the standby mode) into the operation mode (or the application mode).

As one example, the BMS 400 supplies power stored in the battery equipped therein to an A/V system included in the first terminal 500 based upon the received first control signal, thereby converting the operational state of the A/V system from the OFF mode into the operation mode. As such, the first terminal 500 may convert the operational state of at least one terminal included in the first terminal 500, respectively, using the battery equipped in each terminal, or using power supplied from the battery included in the BMS 400 (SP44).

In a normally operating state of the BMS 400 and the first terminal 500, the mobile terminal 300 detects a voltage of the battery of the BMS 400 in real time or at a preset time interval. If the detected battery voltage is lower than or equal to a preset threshold value, the mobile terminal 300 identifies this situation as a power-off state of the vehicle 1000 having the battery, so as to generate a second control signal for controlling power of the first terminal 500 having a communication connection with the vehicle 1000 or the mobile terminal 300. Here, the second control signal may include information for converting the operational state of the at least one terminal included in the first terminal 500 from the operation mode (or the application mode) into the OFF mode (or the standby mode).

Also, upon the comparison between the battery voltage and the preset threshold value, the mobile terminal 300 may be configured to determine whether the battery voltage is kept lower than or equal to the preset threshold value for a preset second time, in order to determine whether the voltage variation of the battery within the BMS 400 is temporary (e.g., a case where the battery voltage variation is temporarily generated due to a particular event) or the vehicle 1000 is substantially in a power-off state. If the state that the battery voltage is lower than or equal to the preset threshold value is retained for the preset second time, the mobile terminal 300 identifies this situation as the power-off state of the vehicle 1000 having the battery, so as to generate a second control signal for controlling power of the first terminal 500 having a communication connection with the vehicle 1000 or the mobile terminal 300 via a short-range communication network or CAN (SP45).

Afterwards, the mobile terminal 300 sends the generated second control signal to the BMS 400 or the first terminal 500 (SP46).

The first terminal 500 accordingly receives the second control signal from the mobile terminal 300, and converts the operational state of at least one terminal included therein from the operation mode (or the application mode) into the OFF mode (or the standby mode) based upon the received second control signal.

As one example, the first terminal 500 may convert the operational state of the navigation device included therein from the operation mode into the OFF mode by controlling a battery included in the navigation device based upon the second control signal sent from the mobile terminal 300.

Also, upon reception of the second control signal from the mobile terminal 300, the BMS 400 stops power supply to the first terminal 500 based upon the received second control signal.

As one example, the BMS 400 stops power supplied to an A/V system included in the first terminal 500 based upon the received second control signal. Also, the operational state of the A/V system is converted from the operation mode into the OFF mode consequent to the stopping of the power supply from the battery included in the BMS 400 (SP47).

Afterwards, the mobile terminal 300 is converted into the sleep mode. In the sleep mode, the mobile terminal 300 monitors whether a voltage variation of the battery included in the BMS 400 is detected by the detector 310 or monitors information relating to the voltage variation of the battery sent from the BMS 400 to determine whether a voltage variation of the battery is detected (SP48).

The above disclosure may be embodied in various forms without departing from the characteristics thereof, it should also be understood that the above-described implementation are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A control method for controlling power functions within a vehicle telematics control unit comprising:
   accessing stored voltage information for a battery included in a vehicle;

determining a present voltage characteristic of the battery based on measurements of voltage;

determining whether a difference exists between the stored voltage information and the present voltage characteristic;

converting an operational state of a vehicle telematics control unit responsive to determining that a difference exists;

accessing threshold information associated with the battery;

comparing the present voltage characteristic of the battery to the threshold information;

determining whether the present voltage characteristic of the battery satisfies a threshold requirement indicated by the threshold information; and generating a first control signal responsive to determining that the present voltage characteristic of the battery satisfies the threshold requirement indicated by the threshold information, wherein the generating of the first control signal comprises: accessing stored information including a preset first time determining whether the present voltage characteristic of the battery is kept higher than a threshold voltage indicated by the threshold information for the preset first time and generating the first control signal in response to determining that the present voltage characteristic of the battery is kept higher than the threshold voltage for the preset first time.

2. The method of claim 1, wherein the threshold information indicates the threshold voltage and the present voltage characteristic of the battery satisfies the threshold requirement by being higher than the threshold voltage.

3. The method of claim 2, wherein converting an operational state of the vehicle telematics control unit includes converting the operational state of the vehicle telematics control unit from a mode in which the vehicle telematics control unit monitors the battery to detect voltage variations to a mode in which the vehicle telematics control unit facilitates the supplying of power to at least one of a communications unit and a control unit.

4. The method of claim 1, wherein the threshold information indicates a threshold voltage and the present voltage characteristic of the battery satisfies the threshold requirement by being lower than the threshold voltage.

5. The method of claim 4, wherein converting an operational state of the vehicle telematics control unit includes converting the operational state of the vehicle telematics control unit from a mode in which the vehicle telematics control unit facilitates the supplying of power to at least one of a communications unit and a control unit to a mode in which the vehicle telematics control unit monitors the battery to detect voltage variations.

6. The method of claim 4, wherein the first control signal indicates that at least one of a communications unit and a control unit are to be powered down.

7. The method of claim 1, wherein the generating of the first control signal further comprises:

generating the first control signal in response to determining that the present voltage characteristic of the battery is kept lower than the threshold voltage for the preset first time.

8. A battery management system for controlling power functions within a vehicle telematics control unit comprising:

a first memory configured to store voltage information for a battery included in a vehicle;

a voltage characteristic identification unit configured to determine a present voltage characteristic of the battery based on measurements of voltage;

a voltage variation identification unit configure to determine whether a difference exists between the stored voltage information and the present voltage characteristic;

a state converter configured to convert an operational state of a vehicle telematics control unit responsive to determining that a difference exists;

a second memory configured to store threshold information associated with the battery;

a comparator configured to compare the present voltage characteristic of the battery to the threshold information;

a battery state identifier configured to determine whether the present voltage characteristic of the battery satisfies a threshold requirement indicated by the threshold information; and a control signal generator configured to generate a first control signal responsive to determining that the present voltage characteristic of the battery satisfies the threshold requirement indicated by the threshold information, wherein the comparator is further configured to determine whether the present voltage characteristic of the battery is kept higher than a threshold voltage indicated by the threshold information for a preset first time and wherein the control signal generator is further configured to generate the first control signal in response to determining that the present voltage characteristic of the battery is kept higher than the threshold voltage for the preset first time.

9. The system of claim 8, wherein the state converter and control signal generator are included in a means for converting an operational state of the vehicle telematics control unit responsive to determining that a difference exists and for generating the first control signal responsive to determining that the present voltage characteristic of the battery satisfies the threshold requirement indicated by the threshold information.

10. The system of claim 8, wherein the threshold information indicates the threshold voltage and the present voltage characteristic of the battery satisfies the threshold requirement by being higher than the threshold voltage.

11. The system of claim 10, wherein the state converter is further configured to convert the operational state of the vehicle telematics control unit from a mode in which the vehicle telematics control unit monitors the battery to detect voltage variations to a mode in which the vehicle telematics control unit facilitates the supplying of power to at least one of a communications unit and a control unit.

12. The method of claim 8, wherein the threshold information indicates a threshold voltage and the present voltage characteristic of the battery satisfies the threshold requirement by being lower than the threshold voltage.

13. The system of claim 12, wherein the state converter is further configured to convert the operational state of the vehicle telematics control unit from a mode in which the vehicle telematics control unit facilitates the supplying of power to at least one of a communications unit and a control unit to a mode in which the vehicle telematics control unit monitors the battery to detect voltage variations.

14. The system of claim 12, wherein the first control signal indicates that at least one of a communications unit and a control unit are to be powered down.

* * * * *